US 6,538,657 B1

(12) United States Patent
Kabir et al.

(10) Patent No.: US 6,538,657 B1
(45) Date of Patent: *Mar. 25, 2003

(54) HIGH-PERFORMANCE BAND COMBINE FUNCTION

(75) Inventors: Ihtisham Kabir, Union City, CA (US); Raymond Roth, Sunnyvale, CA (US); Jaijiv Prabhakaran, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/577,229

(22) Filed: May 23, 2000

Related U.S. Application Data (63) Continuation of application No. 09/289,783, filed on Apr. 9, 1999, now Pat. No. 6,067,099, which is a continuation of application No. 08/563,059, filed on Nov. 27, 1995, now Pat. No. 5,933,160.

(51) Int. Cl.[7] .................................................. G09G 5/37
(52) U.S. Cl. ........................................ 345/561; 345/559
(58) Field of Search ................................. 345/501, 505, 345/530, 561–563, 559, 544

(56) References Cited

U.S. PATENT DOCUMENTS

| 5,185,856 | A | 2/1993 | Alcorn et al. |
| 5,268,995 | A | 12/1993 | Diefendorff et al. |
| 5,394,349 | A | 2/1995 | Eddy |
| 5,504,823 | A | 4/1996 | Yoon |
| 5,533,185 | A | 7/1996 | Lentz et al. |
| 5,555,321 | A | 9/1996 | Ogura et al. |
| 5,598,483 | A | 1/1997 | Purcell et al. |
| 5,734,874 | A | 3/1998 | Van Hook et al. |
| 5,768,429 | A | 6/1998 | Jabbi et al. |

FOREIGN PATENT DOCUMENTS

| WO | 94/03795 A | 3/1992 |
| WO | 94/07208 A | 3/1994 |

OTHER PUBLICATIONS

"i860™ Microprocessor Family," *Intel Microprocessors*, vol. II, 1991.

"MC88110 Second Generation RISC Microprocessor User's Manual," Motorola, Inc., 1991, 44 pages.

Hung et al., "Statistical Inverse Discrete Cosine Transforms For Image Compression," SPIE, vol. 2187, Apr. 1994, pp. 196–205.

Gwennap, "Ultrasparc Unleashes SPARC Performance," Microprocessor Rpt., vol. 8, No. 13, Oct. 3, 1994, p. 1.

Gwennap, "Ultrasparc Adds Multimedia Instructions,", Microprocessor Report, Dec. 1994, pp. 16–18.

Galbi, Dave, et al., "FA 17.1: An MPEG–1 Audio/Video Decoder with Run–Length Compressed Antialiased Video Overlays," IEEE International Solid–State Circuits Conference, Digest of Technical Papers, Feb. 17, 1995, 0–7803–2495–1/95, pp. 286–288.

(List continued on next page.)

*Primary Examiner*—Kee M. Tung
(74) *Attorney, Agent, or Firm*—Townsend and Townsend and Crew LLP

(57) ABSTRACT

A high-performance band combine function to transform a source image of n bands to a destination image of m bands. A source image vector is multiplied with a transformation matrix having n+1 columns and m rows. The values in the transformation matrix may be user-selected. The product of the source image and the transformation matrix is a destination image vector. The destination image vector may be displayed on a computer monitor. To perform the function in a digital system, the pixels of the source image are converted to a partitioned format. The source image is multiplied with the transformation matrix values using partitioned arithmetic. In the digital system, a plurality of partitioned arithmetic operations may be performed in parallel.

31 Claims, 6 Drawing Sheets

OTHER PUBLICATIONS

Pearson, "A Low–Cost, High–Performance PA–RISC Workstation with Built–in Graphics, Multimedia, and Networking Capabilities," Hewlett–Packard Jor., Apr. 1995, vol. 46, No. 2, pp. 6–11.

Bass et al., "The PA 7100LC Microprocessor: A Case Study of IC Design Decisions in a Competitive Environment," Hewlett–Packard Jor., Apr. 1995, vol. 46, No. 2, pp. 12–22.

Bass et al., "Design Methodologies for the PA 7100LC Microprocessor," Hewlett–Packard Jor., Apr. 1995, vol. 46, No. 2, pp. 23–35.

Martin, "An Integrated Graphics Accelerator for a Low–Cost Multimedia Workstation," Hewlett–Packard Jor., Apr. 1995, vol. 46, No. 2, pp. 43,50.

Lee et al., "Real–Time Software MPEG Video Decoder on Multimedia–Enhanced PA 7100LC Processors," Hewlett–Packard Jor., Apr. 1995, vol. 46, No. 2, pp. 60–68.

x = DON'T CARE

|  |  |  |  |  |
|---|---|---|---|---|
| c2 → | a | e | i | x |
| c3 → | b | f | j | x |
| c4 → | c | g | k | x |
| c0 → | d | h | l | x |

FIG. 6B.

| d0 → | d | h |
|---|---|---|
| d1 → | l | x |

HIGH-PERFORMANCE BAND COMBINE FUNCTION

This application is a continuation of U.S. patent application Ser. No. 09/289,783, filed Apr. 9, 1999, now U.S. Pat. No. 6,067,099 which is a continuation of U.S. patent application Ser. No. 08/563,059, filed Nov. 27, 1995, now U.S. Pat. No. 5,933,160 which claims the benefit of European (EPO) patent application number 96308542.8-2201, filed Nov. 26, 1996, which are all incorporated by reference.

BACKGROUND OF THE INVENTION

The present invention relates to the field of graphics and image processing as performed in a digital system. More specifically, the present invention is a band combine function for converting a source image of n bands to a destination image of m bands, especially when performed on a parallel processing system.

In a digital system, images are stored by pixels of the image. One pixel is represented by some number of bits or bytes of memory in the digital system. Furthermore, the image is typically represented by a two-dimensional array of pixels. The image may have multiple two-dimensional arrays of pixels. One array, or "band," represents a particular feature of the image. For example, an image may be a color image in RGB format. A first band of the image represents the red components. A second band represents the green components. And, a third band represents the blue components.

Band combine is used in image processing for many different purposes. For example, band combine may be used to convert an image from one color space to another, such as converting video images in YUV format to RGB format for display on a monitor. Conversely, band combine may also be used to convert an image from RGB format to YUV format. Furthermore, band combine may be used to extract the luminance information from a color image, which may be used to create a black-and-white image. Band combine may be used to highlight particular features of the image according to desired bias values. For example, specific features of a topographic image may be shown in a particular color.

The band combine function is performed by a matrix multiplication operation: D=A*S. S is a vector representing a source pixel. D is a vector representing a destination pixel. A is a transformation matrix, also containing bias values. Matrix A may contain user-defined values. Further, a user may select or define the bias values. For example, to band combine a three-banded source image to obtain a three-banded destination image, the matrix representation would be:

$$\begin{bmatrix} d0 \\ d1 \\ d2 \end{bmatrix} = \begin{bmatrix} a & b & c & d \\ e & f & g & h \\ i & j & k & l \end{bmatrix} * \begin{bmatrix} s0 \\ s1 \\ s2 \\ 1 \end{bmatrix}$$

The values in the transformation matrix may be floating point numbers. The variables d, h, and l are bias values. Using matrix multiplication, the resulting computations that are to be performed on each pixel of the image are:

$d0 = a*s0 + b*s1 + c*s2 + d,$ $d1 = e*s0 + f*s1 + g*s2 + h,$ and $d2 = i*s0 + j*s1 + k*s2 + l.$ Despite improvements in digital processing technology, mathematics operations such as multiply and add are still relatively time consuming. Hence, functions such as the band combine function, which are very computation intensive, require substantial amounts of computing resources and time. Further, as users demand more from the technology, these types of image processing operations will even become more complex. For example, the resolution of images is typically increasing, which leads to greater numbers of pixels per image. Accordingly, the band combine function will take proportionately longer to execute for higher resolution images. Therefore, it becomes increasingly important to improve the techniques used to generate the band combine function, so that the function may be performed more quickly and more efficiently.

As can be seen, an improved technique for generating the band combine function is needed.

SUMMARY OF THE INVENTION

The present invention is a high-performance band combine function to transform a source image of n bands to a destination image of m bands. More specifically, this function performs an arbitrary interband linear combination of a source image using a transformation matrix. The transformation matrix may be of arbitrary size, and can be used to produce a destination image which has a different number of bands from the source image. For example, a RGB image can be converted to a black-and-white image.

In a band combine function of the present invention, a source image vector of pixels is multiplied with the transformation matrix having n+1 columns and m rows. The values in the transformation matrix may be user-selected. The values in the transformation matrix may be floating point numbers. The product of the source image vector and the transformation matrix is a destination image vector. The pixels of the destination image vector, which are the result of the band combine function, may be displayed on a computer monitor.

In the present invention, a digital system is optimized to rapidly evaluate the band combine function. The present invention provides techniques of evaluating the band combine function where many of the computational intensive tasks are performed in concurrently and in parallel. To perform this function in a digital system, the pixels of the source image are converted to a partitioned format. The source pixel bands are multiplied with the transformation matrix values using partitioned arithmetic. In the digital system, a plurality of partitioned arithmetic operations may be performed in parallel. For example, a floating point/graphics unit in the digital system may perform a plurality of multiply operations in a single clock cycle. Further, in one embodiment of the present invention, the matrix multiplication operation may be performed on at least two bands of a pixel at a time. Effectively, this increases the rate at which the band combine function operates. Furthermore, the operations of the band combine function may be pipelined with other processor operations in order to further increase execution speed.

More specifically, the band combine function of the present invention includes the following steps: A first band of a pixel is stored in a first portion of a first register. A second band of the pixel is stored in a second portion of the first register. A first value of a transformation matrix is stored in a first portion of a second register. And, a second value of the transformation matrix is stored in a second portion of the second register. In another embodiment of the present invention, the first portion of the first register and the first portion of the second register are multiplied to obtain a first product. The second portion of the first register and the second portion of the second register are multiplied to obtain a second product. These multiplying steps may be performed concurrently in the digital system.

Other objects, features, and advantages of the present invention will become apparent upon consideration of the following detailed description and the accompanying drawings, in which like reference designations represent like features throughout the figures.

DESCRIPTION OF THE PREFERRED EMBODIMENT

Figure 1:
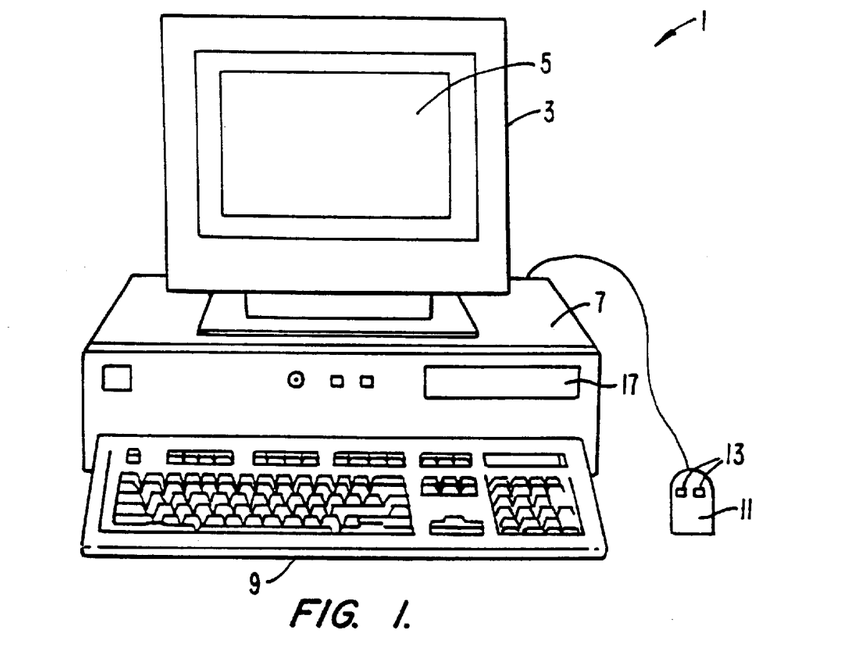
FIG. 1 shows a typical computer system.

FIG. 1 illustrates a system for performing the band combine function of the present invention. More specifically, FIG. 1 may comprise a computer or digital system used to execute the software of the present invention. For example, the bland combine function of the present invention may performed using a Sun workstation. FIG. 1 shows a computer system which includes a monitor 3, screen 5, cabinet 7, keyboard 9, and mouse 11. Mouse 11 may have one or more buttons such as mouse buttons 13. Cabinet 7 houses familiar computer components (not shown) such as a processor, memory, mass storage devices 17, and the like. Mass storage devices 17 may include mass disk drives, floppy disks, magnetic disk, fixed disk, hard disk, CD-ROM, CD-WORM, tape storage, reader, and other similar media, and combinations of these. A binary, machine-executable version, of the software of the present invention may be stored or reside on mass storage devices 17. Furthermore, the source code of the software of the present invention may also be stored or reside on mass storage devices 17 (e.g., which includes magnetic disk, CD-ROM, and reader).

Figure 2:
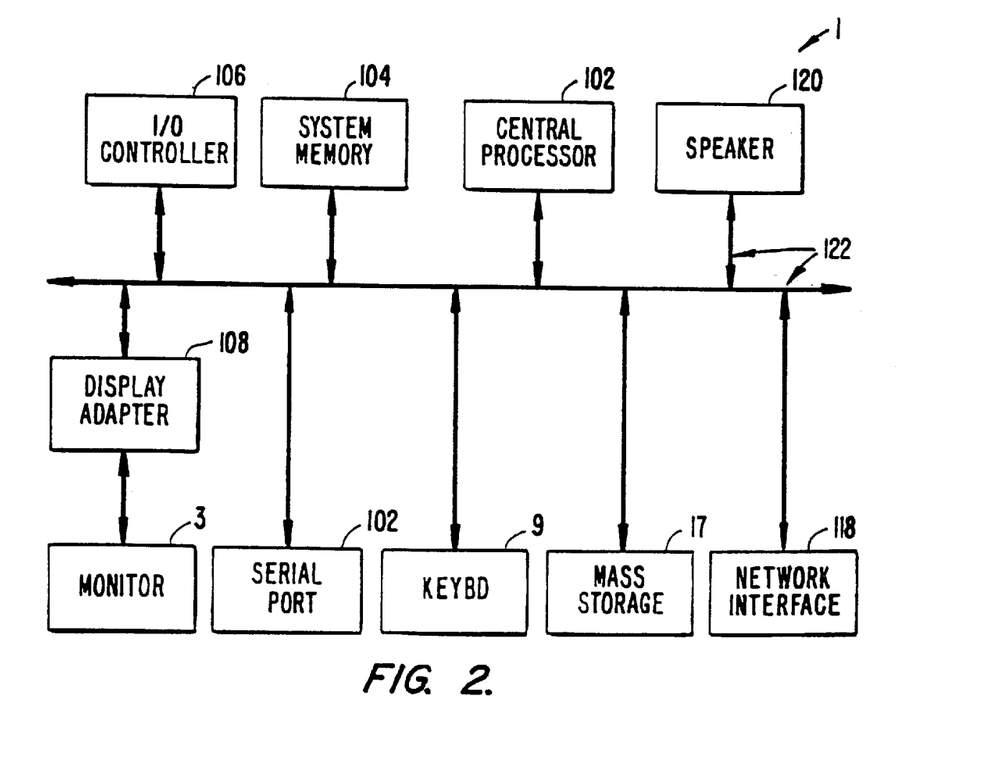
FIG. 2 shows the components of the computer system and their interconnections.

FIG. 2 shows a system block diagram of computer system 1 used to execute the software of the present invention. As in FIG. 1, computer system includes monitor 3, keyboard 9, and mass storage devices 17. Computer system further includes subsystems such as central processor 102, system memory 104, I/O controller 106, display adapter 108, serial port 112, network interface 118, and speaker 120. Other computer systems suitable for use with the present invention may include additional or fewer subsystems. For example, another computer system could include more than one processor 102 (i.e., a multiprocessor system) or a system may include a cache memory.

Arrows such as 122 represent the system bus architecture of computer system 1. However, these arrows are illustrative of any interconnection scheme serving to link the subsystems. For example, speaker 120 could be connected to the other subsystems through a port or have an internal direct connection to central processor 102. Computer system shown in FIG. 2 is but an example of a computer system suitable for use with the present invention. Other configurations of subsystems suitable for use with the present invention will be readily apparent to one of ordinary skill in the art.

Figure 3:
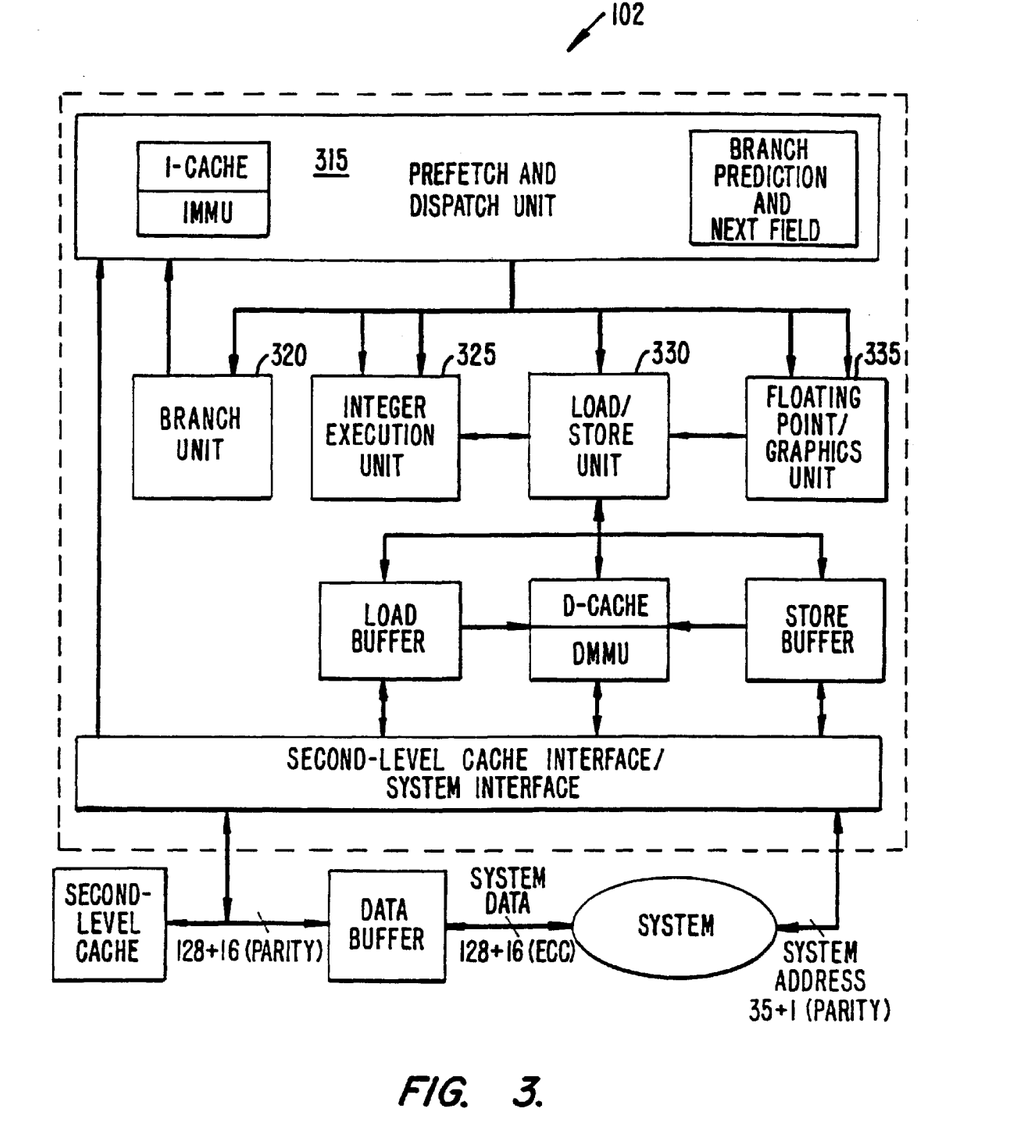
FIG. 3 is a block diagram of a processor for a computer system.

FIG. 3 is a simplified block diagram of a superscaler processor which may be embodied in the digital system shown in FIG. 1 and FIG. 2. More specifically, FIG. 3 shows an UltraSPARC-I processor, designed and manufactured by Sun Microsystems, Inc. This processor is described briefly below and in more detail in Appendix A. The processor is also described in U.S. patent application Ser. No. 08/236, 572 by Timothy J. Van Hook, Leslie Dean Kohn, and Robert Yung, filed Apr. 29, 1994, which is incorporated in its entirety herein by reference.

The processor 102 is a highly integrated superscalar RISC processor. The processor can execute four instructions per cycle even in the presence of conditional branches and cache misses at a high clock rate. A prefetch and dispatch unit (PDU) 315 and branch unit 320 handles branch instructions. An integer execution unit (IEU) 325 handles all integer arithmetic and logical operations. A load/store unit (LSU) 330 handles the transfer of data between different components of the processor. A floating point/graphics unit (FPU) 335 handles floating point and graphics operations. The processor also includes a plurality of registers, caches, buffers, and other components.

Figure 4:
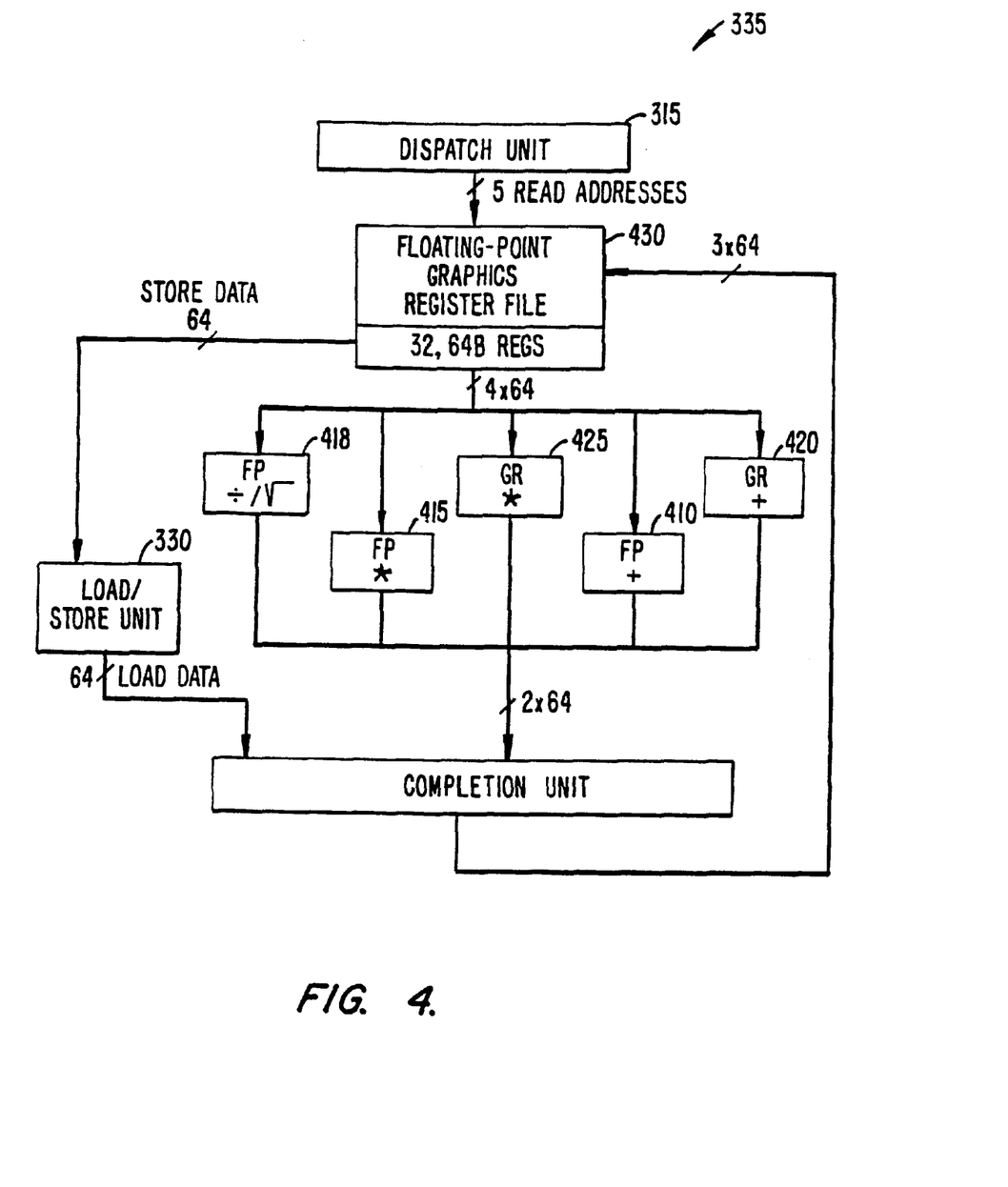
FIG. 4 is a block diagram of a floating point/graphics unit of the processor.

FIG. 4 is a block diagram of FPU 335. FPU 335 integrates the following functions blocks: a floating-point adder 410, a floating-point multiplier 415, a floating-point divider (and square root operator) 418, a graphics adder 420, a graphics multiplier 425, and a register file 430. The interconnections between FPU 335 and PDU 315 and LSU 330 are shown.

FPU 335 may perform two floating-point/graphics operations (FGops) and one FP load/store operation in every cycle. The operations are fully pipelined. FPU 335 has data paths which have been enhanced to include the capability to perform partitioned arithmetic operations that may be required for graphics applications. For example, this capability is provided by a graphics adder, a graphics multiplier and a pixel distance logic implementation. The graphics adder is organized as four independent 16-bit adders, which can perform addition concurrently and in parallel. The graphics multiplier is composed of four independent 8×16 multipliers, which can perform multiplication concurrently and in parallel. A graphics status register (GSR) (not shown) with scale factor and align offset fields is included to support format conversions and memory alignment.

Figure 5A:
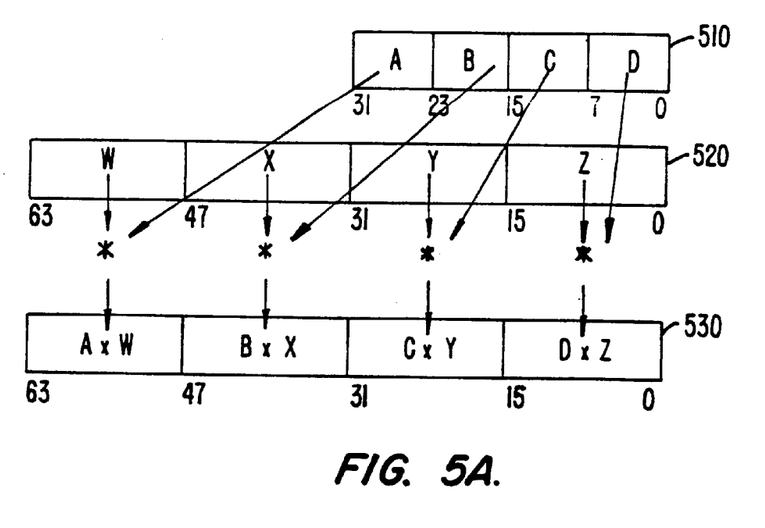
FIGS. 5A–B are block diagrams illustrating examples of partitioned arithmetic.

FIG. 5A illustrates an example of partitioned arithmetic. In particular, FIG. 5A shows a 8-bit by 16-bit partitioned multiplication operation. For example, pixels A, B, C, and D may be stored in a partitioned format in a storage location 510. Storage location 510 stores binary data and may be implemented using, for example, a RAM memory location, register, temporary register, latch, and other similar components, and combinations of these.

In a partitioned format, a first portion of the memory location contains pixel A. A second portion contains pixel B. A third portion contains pixel C. A fourth potion contains pixels D. For example, a pixel may be represented by eight bits. Storage location 510 will be thirty-two-bits wide. Then, pixel D may be stored in bit locations 0 through 7. Pixel C may be stored in bit locations 8 through 15. Pixel B may be stored in bits locations 16 through 23. And, pixel A may be stored in bit locations 24 through 31.

Multipliers W, X, Y, and Z are stored in partitioned format in a storage location 520. The multipliers may be in integer format. The multiplier may be sixteen-bits wide. In other embodiments of the present invention, the multipliers may be in other formats such as floating point representation. Storage location 520 may be a sixty-four-bit storage location. In a partitioned format, multiplier X may be stored in bit locations 0 through 15 of storage location 620. Multiplier Y may be stored in bit locations 16 through 31. Multiplier X may be stored in bit locations 32 through 47. Multiplier W may be stored in bit locations 48 through 63.

In an embodiment of the present invention, when multipliers W, X, Y, and Z are floating point values, these may be converted and stored in storage location 520 in integer format. For example, one technique for converting a floating point value to integer format is to multiply (i.e., "scale up") the floating point value by a large integer which is a power of 2 (e.g., 4096, 65536). The integer portion of this product will be used in the subsequent partitioned arithmetic calculations. By converting the floating point value to integer format, this increases the execution speed of the partitioned arithmetic calculation since integer operations are typically much faster than floating point operations. Furthermore, the conversion also results in relatively little loss in accuracy and precision since only the most significant bits of the floating point values are typically needed.

For partitioned multiplication, pixel D is multiplied with Z; pixel C is multiplied with Y; pixel B is multiplied with X; and pixel A is multiplied with W. The products of these multiplications are stored in a partitioned format in a sixty-four bit storage location 530. The product of D*Z is stored in bit locations 0 through 15 of storage location 530. The product of C*Y is stored in bit locations 16 through 31. The product of B*X is stored in bit locations 32 through 47. The product of A*W is stored in bit locations 48 through 63.

Partitioned arithmetic, such as partitioned multiplication, may be performed in a processor such as shown in FIG. 4. The operations may be performed concurrently and in parallel. For example, the multiplication of the four pixels in FIG. 5A would be done concurrently and in parallel by the graphics multiplier 425. Further, the partitioned arithmetic operation may be performed in a single clock cycle.

Partitioned arithmetic results in improved performance since more data is being operated on at the same period of time. In the example shown in FIG. 5A, the partitioned multiply results in a fourfold performance improvement since four multiply operations are performed concurrently. Partitioned arithmetic also may be performed similarly for addition, subtraction, division, and other functions. A similar improvement in performance would result. A more detailed discussion of partitioning, partitioned data formats, and partitioned arithmetic is provided in Appendix A.

Figure 5B:
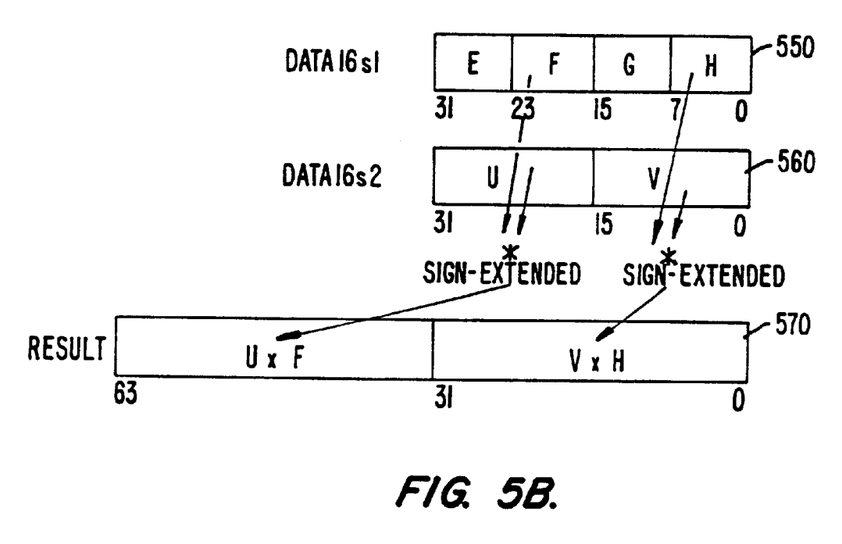

FIG. 5B is another example of partitioned arithmetic. Similar to FIG. 5A, FIG. 5B also shows a partitioned multiplication operation. In this example of partitioned arithmetic, two multiplication operations are performed concurrently and in parallel. Further, the data operands are stored slightly differently than that shown in FIG. 5A. Four eight-bit pixels, E, F, G, and H are stored in partitioned format in a thirty-two-bit storage location 550. Sixteen-bit multipliers U and V are stored in partitioned format in a thirty-two-bit storage location 560. These multipliers may be floating point values that are converted to integer format as described above. The products, U*F and V*H, are stored in partitioned format in a sixty-four-bit storage location 570. The U*F product is stored using thirty-two bits. The V*H product is stored using thirty-two bits.

Figure 6A:
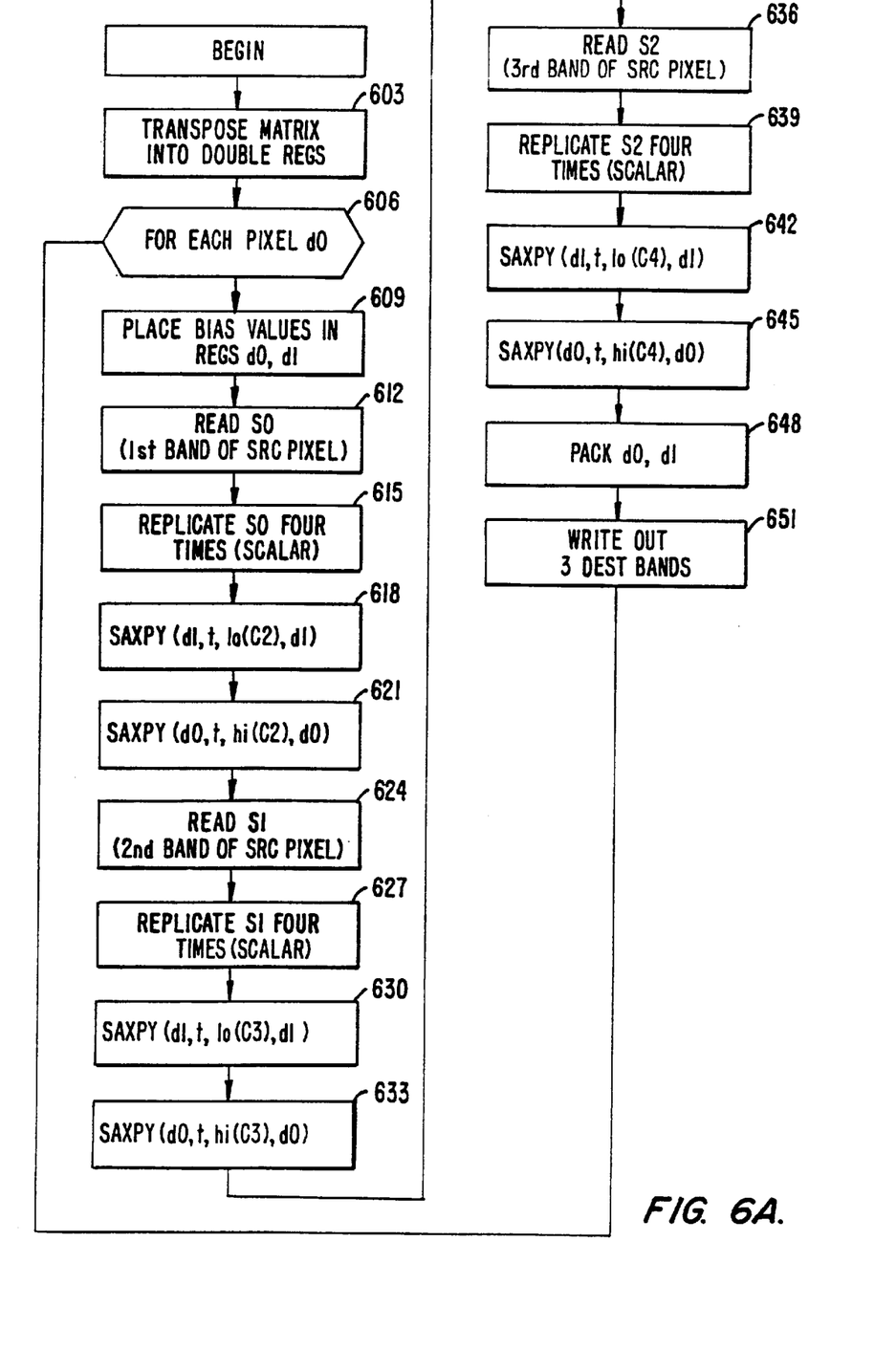
FIG. 6A is flow diagram of the technique of the present invention.

FIG. 6A illustrates a flow diagram of the present invention. The present invention performs a band combine function. The band combine function transforms a source image of n bands into a destination image of m bands according to values specified in a transformation matrix. As discussed in the Background section, the band combine operation involves a matrix multiplication of D=A*S. D is a vector of bands of pixels of the destination image. A is the transformation matrix, which includes bias values. S is a vector of bands of pixels of the source image.

The technique shown in FIG. 6A may be performed in a digital system or machine specially adapted for image processing, as described above. For example, source code for an implemention of an embodiment of the present invention may be written using the Visual Instruction Set (VIS) language for the UltraSPARC-I processor. The VIS language is described in the *Visual Instruction Set User's Guide,* which is incorporated by reference.

The flow diagram in FIG. 6A illustrates a band combine operation for the case of a three-banded (n=3) source image and a three-banded (m=3) destination image. Although a specific example is described, the source image and the destination image may have an arbitrarily large or small number of bands. For example, in one embodiment of the band combine function, the source image may have from one to four bands, and the destination image may have from one to four bands. In other applications, however, the source image and destination image may have more than four bands. However, typically, as the number of bands increases, the number of calculations required also increases.

The particular case where n=3 and m=3 was chosen to illustrate the principles of the present invention, and should not be construed in anyway to limit the present invention. Regardless of the number of bands in the source image and the destination image, the band combine function of the present invention will be performed similarly as described in the flow diagram.

For n=3 and m=3, the specified or transformation matrix A (which may be defined by the user) will have (n+1) columns and m rows. Accordingly, when n=3 and m=3, A will have 4 columns and 3 rows. The following matrix equation illustrates the band combine operation:

$$\begin{bmatrix} d0 \\ d1 \\ d2 \end{bmatrix} = \begin{bmatrix} a & b & c & d \\ e & f & g & h \\ i & j & k & l \end{bmatrix} * \begin{bmatrix} s0 \\ s1 \\ s2 \\ 1 \end{bmatrix}$$

The variables d, h, and l are bias values. The resulting computations that are to be performed on each pixel of the image are:

$d0 = a*s0 + b*s1 + c*s2 + d,$ $d1 = e*s0 + f*s1 + g*s2 + h,$ and $d2 = i*s0 + j*s1 + k*s2 + l.$ In the flow diagram of FIG. 6A, a step 603 transposes the specified matrix A and places the values into double registers in the processor. Values a through l may be floating point numbers. These values may be scaled up and converted into integer format values as discussed above. In a specific embodiment, the values of a through l may be stored as sixteen bits. The values a through l are stored in a storage location such as a register. A typical register is thirty-two bits wide. A double register is sixty-four bits wide. Furthermore, the values a through l are stored in partitioned format. For example, four 16-bit values may be stored in a double register in partitioned format.

Figure 6B:
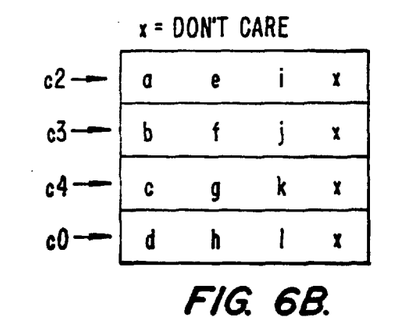
FIGS. 6B–6L show the results at different steps of the flow diagram.

FIG. 6B shows how the variables a through l of transformation matrix A may be arranged in double registers C0, C2, C3, and C4, having sixty-four bits. Please note that contents of the C0, C2, C3, and C4 registers are in partitioned format. For example, register C2 may contain the values for a, e, i, and x. Register C3 will contain b, f, j, and x. Register C4 will contain c, g, k, and x. Register C0 will contain d, h, l, and x. The value "x" denotes a don't care value.

A step 606 begins a loop for calculating the band combine function. In this loop, the necessary matrix operations are performed for each of the pixels of the destination image D.

Figure 6C:
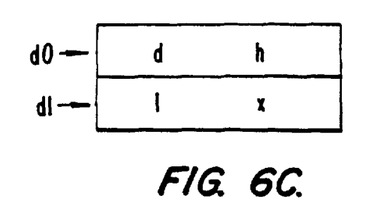

In step 609, the bias values, d, h, and l, are placed into registers d0 and d1. The bias values may be represented using 16 bits. FIG. 6C shows how these bias values are stored in registers d0 and d1. For example, d and h are stored in register d0 (in partitioned format). Register d1 holds l and x (in partitioned format). The value "x" denotes a don't care value.

In step 612, a band of source pixels are read. For this example, the source image has three bands, s0, s1, and s2. The calculations for the bands may be performed in any desired order. For example, band so may be evaluated first, as shown in step 612. Then, bands s1 and s2 will be evaluated subsequently.

Figure 6D:
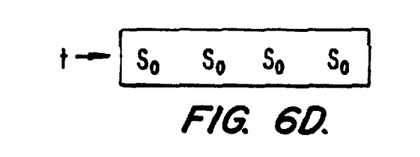

A step 615 performs a "scalar" operation. The scalar operation replicates a band of a source pixel four times and places these in partitioned format into a register (represented by "t"), as shown in FIG. 6D. For example, a band of a pixel may be represented by eight bits. Then, the scalar operation will replicate the eight-bit pixels four times in a thirty-two-bit register. The scalar operation prepares the pixel values for partitioned arithmetic.

A step 618 performs a SAXPY operation, which is a multiply and add operation. More specifically, SAXPY(A, B,C,D) represents the following calculation:

$$A=B*C+D.$$

A, B, C, and D are vectors of two elements. The SAXPY operation is performed using partitioned arithmetic in the processor. As described above, a plurality of parallel multiplication operations may be performed. A plurality of parallel additions may also be performed. In particular, step 618 performs the operation SAXPY(d1,t,lo(c2),d1), which represents the following function:

$$d1=t*lo(c2)+d1.$$

Figure 6E:
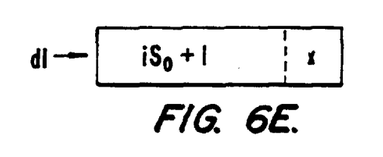

The contents of register d1 will be added to the product of register t and the low order bits of register c2. This product will be added to the previous contents of register d1. More specifically, register t contains s0 and s0. The low order bits of register c2 contain i and x. Register d1 contains l and x. Using partitioned multiplication (such as shown in FIG. 5B), the value s0 (in register t) will be multiplied with i (in register d1), and s0 (in register t) will be multiplied with x (in register d1). These products are partitioned added to the contents of register d1 (i.e., l and x). The result in register d1 is i*s0+l and x (in partitioned format). This is shown in FIG. 6E.

Since arithmetic is partitioned in the present invention, the multiply operations can be performed concurrently (e.g., in a single cycle). Specifically, a plurality of bands of a destination pixel may be evaluated concurrently and in parallel. Furthermore, a plurality of addition operations may similarly be performed concurrently. Consequently, the present invention organizes the operations which need to be performed so that may be executed in parallel. Compared to the case where the arithmetic operations are not performed concurrently, the technique of the present invention greatly improves the execution speed and throughput of the band combine function of the present invention since calculations are performed in a shorter period of time.

Furthermore, in another embodiment of the present invention, the SAXPY operation will be performed on two pixels at a time. For example, a first pixel would be replicated twice and stored in a first portion and a second portion of a register. A second pixel would be replicated twice and stored in a third portion and a fourth portion of this register. This result would look like storage location 510 in FIG. 5A. Then, these pixels are multiplied with the appropriate transformation matrix multipliers (stored similarly as shown in storage location 520 in FIG. 5A). As shown in FIG. 5A, four 8×16 multiply operations may be performed concurrently and in parallel. A graphics multiplier 425 may perform the partitioned arithmetic. The result will be held in a 64-bit register. This partitioned arithmetic technique provides a fourfold performance increase in this operation of the band combine routine.

In step 621, the SAXPY(d0, t, hi(c2), d0) operation is performed, which represents the following operation:

$$d0=t*hi(c2)+d0.$$

Figure 6F:
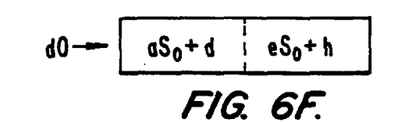

The contents of register do will be added to the product of register t and the high order bits of register c2. Register d0 contains d and h. Register t contains s0 and s0. The high order bits of register c2 contain a and e. The contents of register t and hi(c2) are multiplied together. The result is a*s0 and e*s0. As discussed earlier, these multiply operations may be performed concurrently and in parallel in the processor using partitioned arithmetic. This result is added to the d and h, respectively. Accordingly, the result in the d0 register is a*s0+d and e*s0+h, as shown in FIG. 6F. As described above, step 621 may handle the computations for two pixels concurrently to further improve throughput.

Figure 6G:
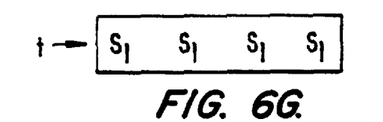

To begin computations for the second band s1, a step 624 reads a source pixel from the second band s1 of the image. In step 627, the source pixel is scalared (replicated four times) and stored in register t. This is shown in FIG. 6G.

In step 630, a SAXPY(d1, t, lo(c3), d1) operation is performed, which represents the following operation:

$$d1=t*lo(c3)+d1.$$

Figure 6H:
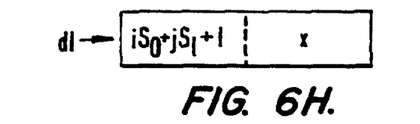

The contents of register d1 will be added to the product of register t and the low order bits of register c3. This product will be added to the previous contents of register d1. More specifically, register t contains s1 and s1. The low order bits of register c3 contains j and x. And, register d1 contains i*s0+l and x. The source pixel in band s1 (in register t) will be partitioned multiplied with j, and the source pixel (in register t) will be multiplied with x. The product will be s1*j and j*x. These products are added the contents of d1. The result, s1*j+i*s0+l and x (don't care), are stored in register d1. This is shown in FIG. 6H.

As described previously, the arithmetic of the present invention is partitioned. A plurality of multiply operations may be performed concurrently (e.g., in a single cycle) in the processor. A plurality of bands of a pixel may be multiplied concurrently. As a result of the partitioned arithmetic, this improves the execution speed of the band combine function of the present invention. Furthermore, as described above, in another embodiment, the SAXPY operation will be performed on two pixels concurrently. Using this technique, this would result in a fourfold performance increase in this operation of the band combine function.

In step 633, a SAXPY(d0, t, hi(c3), d0) operation is performed, which represents the following operation:

$$d0 = t*hi(c3) + d0.$$

Figure 6I:
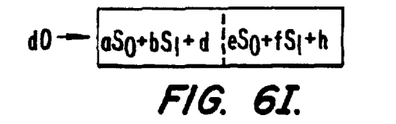

The present contents of register d0 will be added to the product of register t and the high order bits of register c3. This product will be added to the previous contents of register d0. More specifically, register t contains s1 and s1. The high order bits of register c3 contains b and f. Register d0 contains a*s0+d and e*s0+h. The source pixel in band s1 (in register t) are partitioned multiplied with b in register c3; the source pixel (in register t) are multiplied with f in register c3. The product will be s1*b and s1*f. These products are partition added the contents of d1. The result is b*s1+a*s0+d and f*sl+e*s0+h, and will be stored in register d0. This is shown in FIG. 6I.

The arithmetic of the present invention is partitioned. A plurality of arithmetic operations may be performed concurrently. As described above, as a result of partitioned arithmetic, this improves the execution speed of the band combine function of the present invention. Furthermore, in another embodiment, the SAXPY operation will be performed on two pixels (from the same band) in the same period of time. Using this technique, this would result in a fourfold performance increase in this operation of the band combine function.

Figure 6J:
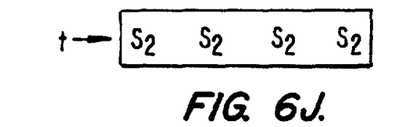

To begin computations on the third band S2, a step 636 reads a source pixel from the third band s2 of the image. In step 639, the source pixel is scalared (replicated four times) and stored in a double precision register t. This is shown in FIG. 6J. In one embodiment, the source pixel may be represented by sixteen bits. Accordingly, register t will be a sixty-four bits wide.

In step 642, a SAXPY(d1, t, lo(c4), d1) operation is performed, which represents the following operation:

$$d1 = t*lo(c4) + d1.$$

Figure 6K:
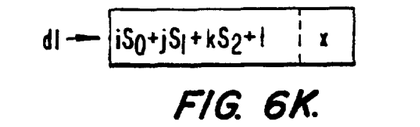

The contents of register d1 will be added to the product of register t and the low order bits of register c3. This product will be added to the contents of register d1. More specifically, register t contains s2 and s2. The low order bits of register c4 contains k and x. And, register d1 contains i*s0+j*s1+l and x. The source pixel in band s2 (in register t) will be multiplied with k (in register c4); the source pixel s2 (in register t) will be partition multiplied with x (in register c4). The product will be s2*k and s2*x. These products are partition added the contents of d1. The result, s2*k+s1*j+i*s0+l and x (don't care), are stored in register d1. This is shown in FIG. 6K.

As described previously, the arithmetic of the present invention is partitioned. A plurality of multiply and add operations may be performed concurrently (e.g., in a single cycle) in the processor. A plurality of bands of a pixel may be multiplied concurrently. As a result of the partitioned arithmetic, this improves the execution speed of the band combine function of the present invention. Furthermore, in another embodiment, the SAXPY operation will be performed on two pixels (from the same band) in the same clock cycle. Using this technique, this would result in a fourfold performance increase in this operation of the band combine function.

In step 645, a SAXPY(d0, t, hi(c4), d0) operation is performed, which represents the following operation:

$$d0 = t*hi(c4) + d0.$$

Figure 6L:
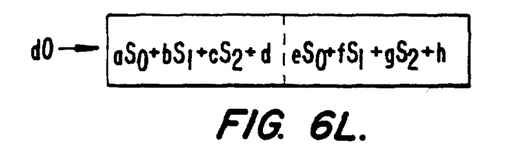

The present contents of register d0 will be added to the product of register t and the high order bits of register c4. This product will be added to the contents of register d0. More specifically, register t contains s2 and s2. The high order bits of register c4 contains c and g. Register d0 contains a*s0+b*s1+d and e*s0+f*s1+h. The source pixel in band s2 (in register t) is partition multiplied with c (in register c4); the source pixel s2 (in register t) is multiplied with g in register c4. The product will be s2*c and s2*g. These products are partition added the contents of d1. The result is c*s2+b*s1+a*s0+d and g*s2+f*s1+e*s0+h, and will be stored in register d0. This is shown in FIG. 6L.

The arithmetic of the present invention is partitioned. A plurality of multiply operations can be performed concurrently (e.g., in a single cycle) in a processor, such as described above. A plurality of add operations may also be concurrently executed. As a result of partitioned arithmetic, this improves the execution speed of the band combine function of the present invention since more computations are performed in a shorter period of time. Furthermore, in another embodiment, the SAXPY operation will be performed on two pixels (from the same band) in the same clock cycle. By processing two pixels simultaneously, this results in a fourfold performance increase in this operation of the band combine function.

Please note that the results in registers d0 and d1 are the same results as described by the matrix equations given above. The band combine function of the present invention improves execution speed by organizing the calculations so that they are performed in parallel using partitioned arithmetic.

A step 648 "packs" the results that are in registers d0 and d1. Registers d0 and d1 contain the pixels of the destination image in partitioned format. Step 648 converts the pixels from partitioned format into standard pixel format. Furthermore, the values in the matrix may have been scaled up and stored in integer format in the registers. Accordingly, the destination pixels may need to be "scaled down" in order to properly reflect this. Step 648 may be performed using the graphics status register (GSR) of FPU 335. The contents of registers d0 and d1 contain the results for the three destination bands, do, d1, and d2. These results are saved (step 651) in standard pixel format and may be written to, for example, the computer display memory.

To complete the band combine function for the entire image, the above process is repeated (step 606) for each of the pixels in the destination image. Then, the pixels may be displayed on a monitor or screen coupled to the digital system. The pixels may also be displayed on the screen as the calculations are being performed.

The band combine function of the present invention may also be improved by pipelining the processor's instructions. For example, the performance of the band combine function may also be further improved by pipelining the partitioned arithmetic operations with other computer operations. In particular, while the multiply operation is being performed, the processor may be loading the contents of another register to be added in the next clock cycle.

The foregoing description of preferred embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. It is intended that the scope of the invention be defined by the claims appended hereto.

What is claimed is:

1. A method of transforming an image using an electronic processor comprising:

storing a band of a pixel of the image in a first portion of a first register;

storing the band of a pixel of the image in a second portion of the first register;

storing a first value of a transformation matrix in a first portion of a second register;

storing a second value of the transformation matrix in a second portion of the second register;

multiplying the first portion of the first register and the first portion of the second register to obtain a first product; and multiplying the second portion of the first register and the second portion of the second register to obtain a second product.

2. The method of claim 1 wherein the steps of multiplying the first portion and multiplying the second portion are performed concurrently by the electronic processor.

3. The method of claim 1 further comprising:

adding a first bias value to the first product; and adding a second bias value to the second product.

4. The method of claim 3 wherein adding the first product and adding the second product are performed in the same clock cycle by the electronic processor.

5. The method of claim 1 wherein the first product is stored in the first portion of the second register, and the second product is stored in the second portion of the register.

6. A method of converting a source image of n bands to a destination image of m bands comprising:

in a computer, converting values of a transformation matrix into a partitioned format, where two or more values of the transformation matrix are stored in a first storage location;

converting bands of source image pixels into a partitioned format, where a band of a source image pixel is stored two or more times in a second storage location; and multiplying the values of the transformation matrix in partitioned format with the bands of source image pixels in partitioned format, resulting in bands of destination image pixels in partitioned format, where two or more destination image pixels is stored in a third storage location.

7. The method of claim 6 further comprising:

adding bias values stored in partitioned format to the bands of destination image pixels in partitioned format.

8. The method of claim 7 wherein during the adding bias values, a plurality of add operations are performed in parallel in the computer.

9. The method of claim 6 further comprising:

converting the bands of destination image pixels from partitioned format into pixel format.

10. The method of claim 6 further comprising:

displaying the bands of destination image pixels on a display.

11. The method of claim 6 wherein the converting bands comprises:

replicating one band of the source image pixel into a first portion and a second portion of a storage location.

12. The method of claim 6 wherein during the multiplying the values, results for at least two bands of a destination image pixel are calculated concurrently by the computer.

13. The method of claim 6 wherein during the multiplying the values, a plurality of multiply operations are performed in parallel in the computer.

14. The method of claim 6 further comprising:

converting the values of the transformation matrix into integer format.

15. The method of claim 6 wherein the converting values comprises:

multiplying the values of the transformation matrix by a multiple of $2^n$ to obtain integer format representations of the values; and storing the integer format representations in partitioned format in the computer.

16. A computer program product having a computer usable medium having computer readable code embodied therein for causing a transformation from a source image of n bands to a destination image of m bands, the computer program product comprising:

computer readable code devices configured to cause a computer to effect converting values of a transformation matrix into a partitioned format at a first storage location;

computer readable code devices configured to cause a computer to effect converting a source image pixel into a partitioned format at a second storage location wherein the source image pixel is stored in two or more positions of the second storage location; and computer readable code devices configured to cause a computer to effect multiplying the values of the transformation matrix in partitioned format and the source image pixels in partitioned format, resulting in destination image pixels in partitioned format at a third storage location.

17. The computer program product of claim 16 further comprising:

computer readable code devices configured to cause a computer to effect converting the values of the transformation matrix into integer format.

18. The computer program product of claim 16 further comprising:

computer readable code devices configured to cause a computer to effect adding bias values stored in partitioned format to the destination image pixels in partitioned format.

19. The computer program product of claim 16 further comprising:

computer readable code devices configured to cause a computer to effect computation of a plurality of multiply operations in parallel.

20. The computer program product of claim 16 further comprising:

computer readable code devices configured to cause a computer to effect replicating one of the source image pixels into a first portion and a second portion of the second storage location.

21. A method of image processing comprising:

storing a band of a pixel in a first portion of a first register;

storing the band of the pixel in a second portion of the first register;

storing a plurality of transpose values from a transformation matrix in a second register; and executing a single instruction of a processor to obtain floating point products for multiplication of the first portion of the first register and a first transpose value in the second register, and the second portion of the first register and a second transpose value in the second register.

22. The method of claim 21 further comprising:

multiplying values stored in the second register by a number that is a multiple of $2^n$.

23. The method of claim 21 wherein the floating point products are stored in a third register.

24. The method of claim 23 further comprising:

storing a plurality of bias values in a fourth register; and executing a single instruction to obtain a result of adding the plurality of bias values to the products in the third register.

25. The method of claim 21 wherein the register holds at least 32 bits.

26. The method of claim 21 wherein the register holds at least 64 bits.

27. A method of image processing using an electronic processor comprising:

storing a pixel in a plurality of portions of a first register, wherein the portions of the first register will comprise the same bits;

storing transpose values of a transformation matrix in a plurality of portions of a second register; and executing a single instruction of the processor to obtain a plurality of products from multiplying values in the first and second registers.

28. The method of claim 27 wherein the same bits include bits that represent a color of the pixel.

29. The method of claim 27 wherein the same bits include every bit of the pixel.

30. The method of claim 27 wherein the single instruction performs a floating point multiplication.

31. The method of claim 27 wherein the portions of the first register will comprise one band of the pixel.

\* \* \* \* \*